Patented May 23, 1950

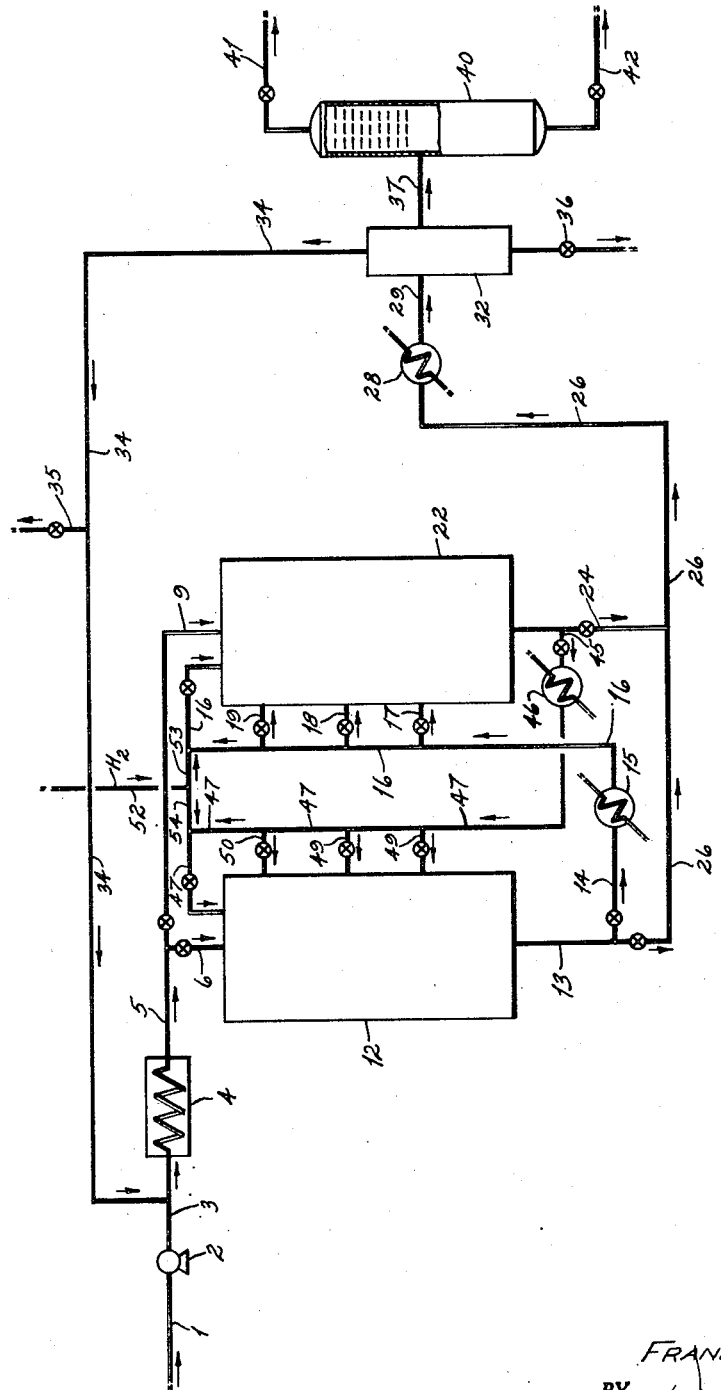

2,508,743

UNITED STATES PATENT OFFICE 2,508,743

HIGH-PRESSURE LOW-TEMPERATURE CATALYTIC CONVERSION OF CARBON MONOXIDE

Frank H. Bruner, Fishkill, N. Y., assignor to The Texas Company, New York, N. Y., a corporation of Delaware Application September 13, 1947, Serial No. 773,884

15 Claims. (Cl. 260—449.6)

This invention relates to a method for effecting at elevated pressures and low temperatures catalytic conversions in which carbon monoxide is one of the reactants and the catalyst contains a member of the iron group as an active constituent.

When a reaction mixture containing a substantial percentage of carbon monoxide is contacted at elevated pressures and comparatively low temperatures with a catalyst containing a member of the iron group comprising iron, cobalt and nickel, there is formed a volatile carbonyl of the metal or metals of the iron group present in the catalyst. Thus, there may be formed nickel tetracarbonyl, $(Ni(CO)_4)$, cobalt tetracarbonyl, $(Co(CO)_4)$ and iron pentacarbonyl $(Fe(CO)_5)$, all of which are volatile under the conditions of reaction generally employed; the melting points of these carbonyl compounds are $-13°$, $124°$ and $-6°$ F., respectively at atmospheric pressure. The product from such a catalytic conversion contains a substantial amount of the volatile metal carbonyl and the presence of metal carbonyl in the effluent product creates a serious problem. Removal of metal from the reaction zone in the form of a carbonyl not only entails a serious loss of expensive catalyst, but also creates a serious operating problem. The decomposition of the metal carbonyl to form carbon monoxide and metal during the isolation and recovery of the products eventually requires a shut-down of the recovery unit in order to remove deposited metal from pipes, stills and fractionators.

This invention affords a method of continuous operation of a high pressure-low temperature conversion in which carbon monoxide is reacted over a catalyst containing a metal of the iron group. The invention thus finds application when the reaction zone is maintained at a temperature below about 400° F. and at a pressure over about 150 pounds per square inch, the precise temperature and pressures employed being consonant with the predetermined optimum conditions for the desired reaction. For example, temperatures may be in the range of about 150 to 400° F. and pressures in the range 150 to 2,000 pounds or more per square inch.

In accordance with the invention, reactants containing carbon monoxide are passed into a reaction zone maintained at a pressure over about 150 pounds per square inch and at a temperature below about 400° F., and are contacted in the reaction zone with a catalyst containing a member of the iron group as an active constituent. Substantial conversion of the reactions into the desired products is effected in this primary reaction zone. The effluent comprising products of conversion and unreacted reactants contains a substantial quantity of metal carbonyl; for example, when a cobalt catalyst is employed, the cobalt carbonyl content of the effluent may amount to as much as from two to three weight per cent. The effluent is then passed into a secondary zone in which the pressure is maintained below about 100 pounds per square inch. Advantageously, the secondary zone is maintained at a temperature substantially higher than that prevailing in the primary zone as decomposition of the metal carbonyl is accelerated at elevated temperature. In the secondary zone, the metal carbonyl present in the effluent decomposes under the conditions of temperature and pressure existing therein to form carbon monoxide and metal which latter deposits therein.

As the reaction continues, increasing quantities of catalyst metal accumulate in the secondary zone as the metal carbonyl in the effluent is decomposed in the secondary zone. The secondary zone is of such construction that it can withstand the elevated pressures required to effect the high pressure-low temperaure reaction of carbon monoxide. When a substantial quantity of metal is accumulated in the secondary zone, the flow of reactants is reversed and the secondary zone is used as the reaction zone while the primary zone serves as the decomposition zone for the metal carbonyl. The secondary zone is adjusted to that temperature below about 400° F. and that pressure above 150 pounds per square inch which are conducive to effect the desired reaction. The effluent from the secondary zone during this stage of the operations is introduced into the primary zone which is now maintained at a pressure below about 100 pounds per square inch and at a temperature substantially above that required for the reaction. The metal carbonyl content in the product effluent is now decomposed in the primary zone under the conditions prevailing therein so that catalyst metal is returned to the primary zone as the metal carbonyl decomposes therein. By periodically reversing the flow of reactants and changing the conditions of temperature and pressure prevailing within the two zones, it is possible to conduct a continuous low temperature-high pressure conversion of carbon monoxide-containing reactants.

The secondary decomposition zone advantageously contains a surface-active material or a spent catalyst so as to provide a surface upon which the metal formed by the decomposition of the metal carbonyl may deposit. Moreover, the presence of surface-active material accelerates the decomposition of the metal carbonyl to carbon monoxide and metal.

When a cobalt catalyst is employed to effect the low temperature-high pressure conversion, the presence of a surface-active material such as uncalcined diatomaceous earth, silica-stabilized alumina, etc., in the decomposition zone results in the formation of a supported catalyst therein, which is advantageous since supported catalysts have proven among the most active of the cobalt catalysts for this type of conversion.

The invention has particular application when the catalyst in the low temperature-high pressure conversion contains cobalt since cobalt is widely used as a catalyst in this type of conversion. Supported or unsupported cobalt catalysts are generally employed to effect low temperature-high pressure conversions involving carbon monoxide. Consequently, in further description of the invention, a cobalt catalyst will be referred to in illustrating the method of the invention but it is to be understood that no limitation or exclusion of nickel or iron type catalysts from the scope of the invention is thereby intended.

The reaction of an olefin with carbon monoxide and hydrogen in the presence of a cobalt catalyst to produce substantial quantities of specific oxygen-containing compounds is illustrative of the low temperature-high pressure conversions to which this invention is applicable. In order to effect the reaction of an olefin with carbon monoxide and hydrogen to form specific oxygen-containing compounds, it is usually necessary to keep the pressure in the reaction zone in excess of about 150 pounds per square inch and maintain the temperature below about 250° F. when a cobalt catalyst is employed. As illustrative of the type of reaction in question, there may be cited the reaction of ethylene with carbon monoxide and hydrogen to form a product mixture comprising mainly propionaldehyde and diethylketone. In further description of the invention, this specific reaction will be used to illustrate the process of the invention.

Important features of this invention are these: first, a method is provided for removing metal carbonyl from the effluent from a low temperature-high pressure conversion involving carbon monoxide and employing a catalyst containing a metal of the iron group as a constituent thereof; secondly, a method is provided for continuously effecting such a low temperature-high pressure conversion by merely reversing the flow of reactants and switching the conditions of temperature and pressure prevailing in the primary and secondary zones of the process.

It has been found that an active catalyst is formed by passing the effluent liquid product containing cobalt carbonyl over a spent supported cobalt catalyst at 200° F. and atmospheric pressure, together with a slow stream of hydrogen. The catalyst formed in this fashion, that is, by the decomposition of cobalt carbonyl present in the effluent product, was evaluated using an ethylene, carbon monoxide and hydrogen mixture and proved to be only slightly less active than a fresh catalyst with liquid yield in grams per cubic meter of gaseous reactants being the measure of activity.

In order that the invention may be more fully described, reference will now be made to the accompanying figure in which a flow diagram of the method of the invention is presented.

In describing the method of the invention, the reaction of ethylene with carbon monoxide and hydrogen in contact with a cobalt catalyst to form a product mixture comprising mainly diethylketone and propionaldehyde will serve to illustrate the process of the invention. This reaction requires a pressure in excess of 200 pounds per square inch in order to effect substantial conversion of the desired products. Temperatures in the range of 100° F. to 300° F. may be employed with 125° F. to 225° F. constituting the usual operating temperature. A catalyst comprising about 32 weight per cent cobalt, about 64 weight per cent uncalcined diatomaceous earth, about 3 weight per cent magnesia and about 1 weight per cent thoria has proven to be an effective catalyst for this reaction.

A mixture of ethylene, carbon monoxide and hydrogen in a molecular ratio of about 2 parts of ethylene to 1 part of carbon monoxide to 1 part of hydrogen is obtained from a source not shown through a pipe 1; this ratio is not static and may be varied from about 3:1:1 to 1:1:2, with the reactants being in the same order as above. In the compressor 2, the reaction mixture is raised to that pressure which has proven most effective in directing the reaction of ethylene, carbon monoxide and hydrogen towards the production of the desired product which may be either diethylketone or propionaldehyde, as the situation may demand. For purposes of illustration, it will be assumed that the reactant mixture is raised to a pressure of about 700 pounds per square inch in the compressor 2. The reactant mixture leaves the compressor 2 through a pipe 3 and is introduced into a preheater 4 wherein it is raised to the temperature which has been found to be most suitable for the reaction; in this instance, it will be assumed that the reactant mixture is heated to a temperature of about 150° F. in the preheater 4.

The reactant mixture leaves the preheater 4 through a pipe 5 and is diverted therefrom through a branch pipe 6 and is introduced into a primary reaction zone 12. The reaction zone is maintained at a pressure of about 700 pounds per square inch and at a temperature of about 150° F. Cooling elements, such as tubular pipes through which heat exchange medium flows, are used to preserve the temperature at the proper level in the reaction unit 12; these cooling elements were not shown since there are many conventional types which serve adequately. The reactor 12 is designed so that it may withstand pressures up to about 2,000 pounds per square inch. There are well-known methods of constructing reactors to withstand pressures of this magnitude.

The reaction zone 12 is filled with supported cobalt catalyst of a composition which has been described previously, namely about 32 weight per cent cobalt, about 64 weight per cent uncalcined diatomaceous earth, about 3 weight per cent magnesia and about 1 weight per cent thoria. The mixture of ethylene, carbon monoxide and hydrogen is substantially converted into a product mixture comprising mainly diethylketone and propionaldehyde by contact with a cobalt catalyst of this nature. Carbon monoxide simultaneously reacts with cobalt to form a small amount of cobalt tetracarbonyl $(Co(CO)_4)$. Cobalt carbonyl is a crystalline substance of low melting point, namely about 124° F. and is soluble in organic compounds, such as the products of reaction, diethylketone and propionaldehyde.

About an 80 per cent conversion of ethylene to liquid products is effected in the reaction zone 12 so that the effluent from the reactor 12 comprises unreacted ethylene, carbon monoxide and hydrogen, diethylketone, propionaldehyde, other products of conversion and in addition generally contains about 1.5 to 4 per cent cobalt carbonyl. The effluent leaves the reactor 12 through a pipe 13 and is advantageously introduced through a pipe 14 into a heater 15 wherein the total effluent is raised to a temperature about 50–100° F. above the reaction temperature maintained in the primary zone 12, viz., in this instance to about 200–250° F. This temperature rise in the heater 15 is not sufficient to cause decomposition of the cobalt carbonyl at the pressure existing therein which is equivalent to the reaction pressure, 150 pounds per square inch, in this instance.

The effluent at a temperature 50–100° F. above reaction temperatures leaves the heater 15 through a conduit 16 and is therethrough introduced into a secondary zone 22. Advantageously downflow of reactants through both primary and secondary zones is effected as illustrated in the drawing.

Provision is made for introducing the effluent into the secondary zone at a plurality of points through inlet pipes 17, 18 and 19. Introduction of the effluent into the secondary zone at a plurality of points aids in distributing the metallic cobalt formed by the decomposition of the cobalt carbonyl uniformly throughout the secondary zone 22.

The secondary zone 22 is maintained at about 200 to 250° F. and is maintained at a pressure lower than 100 pounds per square inch and preferably at about atmospheric pressure. This secondary zone is constructed so that it can withstand elevated pressures up to about 2,000 pounds per square inch because this secondary zone 22 serves as the reaction zone when the flow of reactants is reversed. Moreover, the secondary zone 22 advantageously contains surface-active material such as uncalcined diatomaceous earth.

Cobalt carbonyl decomposes in the secondary zone under the conditions of temperature and pressure prevailing therein. The metallic cobalt formed by the decomposition deposits upon the surface-active material contained therein. A material comprising about 64 parts uncalcined diatomaceous earth, about 3 parts magnesia and about 1 part thoria serves admirably as the decomposition surface; spent supported cobalt catalyst also can be used as the decomposition surface. As cobalt concentration in the secondary zone 22 builds up by the continuous decomposition of cobalt carbonyl therein, an active catalyst is formed whose composition approaches that of the active catalyst employed in the reaction zone 12. Moreover, the presence of the surface-active material increases the rate of decomposition of the cobalt carbonyl in the secondary zone 22.

Advantageously a slow stream of hydrogen is passed through the secondary zone 22 together with the effluent from the primary zone 12. The presence of a small amount of hydrogen during the decomposition of cobalt carbonyl under the conditions prevailing in the secondary zone 22 improves the catalytic activity of the cobalt catalyst thereby formed. Hydrogen for this purpose is obtained through the pipe 52 and is introduced into the secondary zone 22 through pipes 53 and 16.

In certain cases, it is possible to omit the heater 15 which is used to raise the effluent from the reaction zone to a high temperature before its introduction into a secondary zone 22. This heating step may be omitted when the reduction in pressure in the secondary zone 22 is sufficient to cause decomposition of the cobalt carbonyl present in the effluent. However, in the ordinary instance, it is advisable to employ the heater 16 to raise the effluent to a temperature 50–100° F. above reaction temperature prior to its introduction into the secondary zone because more complete removal of cobalt carbonyl is thereby effected; the efficiency of removal can be ascertained from the amount of cobalt carbonyl in the effluent from the secondary zone.

The effluent which leaves the secondary zone 22 contains unreacted ethylene, carbon monoxide and hydrogen and the products of conversion, but has a cobalt carbonyl content of less than 0.2 per cent, as contrasted with the 1.5 to 4 per cent concentration in the effluent leaving the reaction zone 12. The effluent leaves the secondary zone 22 through a pipe 24 and flows into a conduit 26 which leads to the product recovery system. The effluent flows through the conduit 26 into an exchanger 28 wherein it is cooled to about atmospheric temperature which causes the condensation of the normally liquid products of conversion. The total effluent then passes through a pipe 29 into a separator 32.

In the separator 32, the condensed products of conversion are separated from the normally gaseous products and unreacted ethylene, carbon monoxide and hydrogen. A gas phase comprising mainly unreacted ethylene, carbon monoxide and hydrogen leaves the separator 32 through a pipe 34 and is then recycled either in whole or in part to the reaction zone. To this end, the gas phase flows through the pipe 34 into the pipe 3 wherein it combines with the fresh feed of reactants. The unrecycled portion of the gas phase may be removed from the recycle line through the vent 35.

The water produced in the reaction which ordinarily is of limited amount is withdrawn from the separator 32 through a pipe 36.

The organic products of conversion leave the separator 32 through a pipe 37 and are introduced into a fractionating column 40. Therein the organic products of conversion are fractionated into individual components. The major products of conversion, namely propionaldehyde and diethylketone, are taken off overhead in separate fractions through a pipe 41; the propionaldehyde fraction distills over between about 117 to 124° F.; the diethylketone fraction distills over between about 210 to 217° F. The high boiling residue is withdrawn from the fractionating column 40 through a pipe 42.

When the cobalt concentration in the secondary zone 22 has reached a substantial level, the flow of reactants may be reversed so that the secondary zone 22 acts as the reaction zone and the primary zone 12 acts as the cobalt carbonyl decomposition zone. A rough estimate of the amount of cobalt that is deposited in the secondary zone 22 may be made by weighing the liquid product obtained including propionaldehyde, diethylketone, water and high boiling residuum and multiplying by 0.02, which is the approximate fractional concentration of $Co(CO)_4$ in the effluent leaving the primary reaction zone. Another means of determining when the flow of reactants should be reversed is when the cobalt carbonyl content of the effluent leaving the secondary zone 22 starts to rise considerably above a level of about 0.3 weight per cent.

The reversal of the direction of flow is readily effected; the reactants, instead of being diverted from pipe 5 through the pipe 6 into the primary zone 12, flow past the branch pipe 6 and are introduced into the secondary zone 22 through a pipe 9. The secondary zone 22 is now maintained at about 150° F. and at a pressure of 700 pounds per square inch and the exothermic heat of reaction is absorbed by means of heat exchange elements which are not shown. Ethylene, carbon monoxide and hydrogen are substantially converted into a product mixture comprising mainly propionaldehyde and diethylketone by contact with the catalyst present therein, which is formed by the decomposition of cobalt carbonyl to metallic cobalt upon the surface of the mixture of uncalcined diatomaceous earth, magnesia and thoria present therein.

An effluent comprising unconverted reactants, products of conversion and cobalt carbonyl leaves the secondary zone 22 through the pipe 24 and, instead of flowing therethrough to the product recovery system, is diverted therefrom through a pipe 45. The effluent is then introduced into a heater 46 wherein it is raised to a temperature 50° to 100° F. above reaction temperature. Thereafter the effluent is introduced into the primary zone 12 through a pipe 47; provision is made for introduction of the effluent into the primary zone at a plurality of points through pipes 48, 49 and 50. A slow stream of hydrogen is advantageously introduced through pipes 52, 54 and 47 into the primary zone 12, together with the effluent. The primary zone is now maintained at a pressure below 100 pounds per square inch and preferably at atmospheric pressure. The cobalt carbonyl present in the effluent separates therefrom by decomposing under the conditions prevailing within the primary zone 12 to form carbon monoxide and cobalt which deposits upon the supporting material and supported catalyst still present in the primary zone 12.

The products of conversion and unconverted reactants leave the primary zone 12 through a pipe 13 and flow into the conduit 26. The products and unconverted reactants flow through the conduit 26 to the condenser 28 and the rest of the separating and fractionating system, which has been previously described.

It is contemplated that the catalyst in both the zones may be regenerated by treatment with hydrogen at elevated temperature. By this treatment, a catalyst whose activity has decreased with continued use may be restored to a high degree of activity.

The invention has been described in detail in connection with the reaction of ethylene with carbon monoxide and hydrogen in contact with a cobalt catalyst to produce a mixture comprising mainly diethylketone and propionaldehyde. It is reiterated at this point that the invention is applicable and useful in any reaction involving carbon monoxide and a catalyst containing a metal of the iron group in which low temperatures and high pressures are prerequisite operating conditions. There is included within the scope of the invention the reaction of carbon monoxide at elevated pressure and low temperature with compounds other than olefins such as aldehydes, nitriles, ketones, etc., when a catalyst containing a metal of the iron group is used to effect the desired conversion.

Despite the fact that the invention has been described in connection with a fixed bed type of conversion in both the primary and secondary zones, it is contemplated that the invention is applicable to a conversion in which the catalyst in the reaction zone and the material which acts as a decomposition surface in the decomposition zone are maintained in a state of fluidization. Primary attention has been directed towards the fixed bed type of operation because the low temperatures which are a necessary condition for the application of the method of this invention usually preclude the use of high space velocities which are associated with most types of fluidization. However, it is conceivable that both the reaction zone and the decomposition zone may be maintained in a state of fluidization by mechanical means similar to that which has been disclosed in co-pending applications of Eugene E. Sensel and Roland A. Beck, Serial Nos. 700,507 and 700,508, both filed on October 1, 1946, the latter having matured into Patent No. 2,501,695.

Obviously many modifications and variations of the invention, as hereinbefore set forth, may be made without departing from the spirit and scope thereof and, therefore, only such limitations should be imposed as are indicated in the appended claims.

I claim:

1. In conversions wherein carbon monoxide-containing reactants are contacted at elevated pressure and low temerature with a catalyst containing a metal of the iron group, the method which comprises effecting substantial conversion of the reactants in a primary zone, maintaining said primary zone at a pressure above 150 pounds per square inch and a temperature below 400° F. which are suitable for effecting the desired conversion, removing a product stream comprising products of conversion, unconverted reactants and a significant quantity of metal carbonyl, passing said product stream through a secondary zone maintained at a pressure less than about 100 pounds per square inch so as to effect the decomposition of metal carbonyl contained in said product stream in said secondary zone, removing from said secondary zone an effluent comprising mainly products of conversion and unconverted reactants, continuing operation in the aforementioned fashion until a substantial quantity of metal of the iron group is present in said secondary zone, then reversing the reaction conditions of temperature and pressure prevailing within the primary and secondary zones so that the primary zone is maintained at a pressure less than 100 pounds per square inch and the secondary zone is maintained at a pressure over 150 pounds per square inch and at a temperature of less than 400° F., introducing the reactants into said secondary zone, effecting substantial conversion of said reactants in said secondary zone, removing a product stream therefrom and introducing said product stream into said primary zone wherein decomposition of metal carbonyl contained therein is effected and removing an effluent from said primary zone comprising mainly products of conversion and unconverted reactants.

2. In conversions wherein carbon monoxide-containing reactants are contacted at elevated pressure and low temperature with a catalyst containing a metal of the iron group, the method which comprises effecting substantial conversion of the reactants in a primary zone, maintaining said primary zone at a pressure above 150 pounds per square inch and a temperature below 400° F. which are suitable for effecting the desired conversion, removing a product stream comprising products of conversion, unconverted reactants and a significant quantity of metal carbonyl, passing said product stream through a secondary zone maintained at a pressure less than about 100 pounds per square inch and at a temperature 50 to 100° F. above that prevailing in said primary zone, effecting decomposition of metal carbonyl contained in said product stream in said secondary zone, removing from said secondary zone an effluent comprising mainly products of conversion and unconverted reactants, continuing operation in the aforementioned fashion until a substantial quantity of metal of the iron group is present in said secondary zone, then reversing the reaction conditions of temperature and pressure prevailing within the primary and secondary zones so that said primary zone is maintained at a temperature 50 to 100° F. above that prevailing in said secondary zone at a pressure less than 100 pounds per square inch and the secondary zone is maintained at a pressure over 150 pounds per square inch and at a temperature of less than 400° F., introducing the reactants into said secondary zone, effecting substantial conversion of said reactants in said secondary zone, removing a product stream therefrom and introducing said product stream into said primary zone wherein decomposition of metal carbonyl contained therein is effected and removing an effluent from said primary zone comprising mainly products of conversion and unconverted reactants.

3. The method according to claim 2 in which the metal of the iron group is cobalt.

4. In conversions wherein carbon monoxide-containing reactants are contacted at elevated pressure and low temperature with a catalyst containing a metal of the iron group, the method which comprises passing a reactant stream through a reaction zone maintained at temperature below 400° F. and pressure above 150 pounds per square inch, effecting substantial conversion of the reactants in said reaction zone, forming metal carbonyl during passage of reactants through said reaction zone, removing from said reaction zone a product stream comprising products of conversion, unconverted reactants and a significant quantity of metal carbonyl, passing said product stream together with added hydrogen through a secondary zone, maintaining said secondary zone at temperature and pressure conditions effective for the decomposition of said metal carbonyl, decomposing said metal carbonyl in said secondary zone, removing from said secondary zone an effluent comprising mainly products of conversion, unconverted reactants and added hydrogen, periodically changing the flow so that said reactant stream is passed into said secondary zone and the effluent therefrom together with added hydrogen is passed into the reaction zone, and switching the temperature and pressure conditions prevailing within said zones so that said secondary zone is maintained at predetermined conditions of temperature and pressure consonant with the desired conversion and the reaction zone is maintained at temperature and pressure conditions effective for the decomposition of said metal carbonyl.

5. In the conversion of carbon monoxide-containing reactants at elevated pressure and temperature by contact with a catalyst of the iron group, the method which comprises passing reactants containing carbon monoxide through a reaction zone containing a catalyst of an iron group metal, maintaining said reaction zone at a temperature below 400° F. and at a pressure above 150 pounds per square inch, forming metal carbonyl during passage of reactants through said reaction zone, effecting conversion of reactants in the presence of said catalyst and said metal carbonyl, passing an effluent containing products of conversion and said metal carbonyl from said reaction zone into a secondary zone, maintaining said secondary zone at temperature and pressure conditions effective for decomposition of said metal carbonyl, decomposing said metal carbonyl in said secondary zone, removing from said secondary zone a product stream substantially free from metal carbonyl, periodically reversing flow of said reactants and said effluent with respect to said reaction zone and said secondary zone.

6. A method according to claim 5 in which the secondary zone contains an adsorptive material.

7. A method according to claim 5 in which the secondary zone contains solid cobalt catalyst.

8. In the conversion of carbon monoxide, hydrogen, and olefin into carbonylic products at elevated pressure and temperature by contact with a metal of the iron group, the method which comprises passing reactants comprising carbon monoxide, hydrogen and olefin through a reaction zone containing a catalyst of an iron group metal, maintaining said reaction zone at a pressure above 150 pounds per square inch and at a temperature below 400° F., forming metal carbonyl during passage of reactants through said reaction zone, effecting conversion of reactants into carbonylic products, passing an effluent containing products of conversion and said metal carbonyl from said reaction zone into a secondary zone, maintaining said secondary zone at temperature and pressure conditions effective for decomposition of said metal carbonyl, decomposing said metal carbonyl in said secondary zone, removing from said secondary zone a product stream substantially free from metal carbonyl, periodically reversing flow of said reactants and said effluent with respect to said reaction zone and secondary zone.

9. A method according to claim 8 in which the catalyst is cobalt.

10. A method according to claim 8 in which the secondary zone is maintained at a temperature of approximately 100° F. higher than reaction zone.

11. A method according to claim 8 in which the secondary zone contains a surface-active supporting material.

12. A method according to claim 8 in which the secondary zone contains spent cobalt catalyst.

13. In the conversion of carbon monoxide, hydrogen, and olefin into carbonylic products as elevated pressure and temperature by contact with a metal of the iron group, the method which comprises passing reactants comprising carbon monoxide, hydrogen and olefin through a reaction zone containing a catalyst of an iron group metal, maintaining said reaction zone at a pressure above 150 pounds per square inch and at a temperature below 400° F., forming metal carbonyl during passage of reactants through said reaction zone, effecting conversion of reactants into carbonylic products, passing an effluent containing products of conversion and said metal carbonyl from said reaction zone together with added hydrogen into a secondary zone, maintaining said secondary zone at temperature and pressure conditions effective for decomposition of said metal carbonyl, decomposing said metal carbonyl in said secondary zone, removing from said secondary zone a product stream substantially free from metal carbonyl, periodically reversing flow of said reactants and said effluent with respect to said reaction zone and secondary zone.

14. In the conversion of carbon monoxide, hydrogen, and olefin into carbonylic products at elevated pressure and temperature by contact with a metal of the iron group, the method which comprises passing reactants comprising carbon monoxide, hydrogen and olefin through a reaction zone containing a catalyst of an iron group metal, maintaining said reaction zone at a pressure about 150 pounds per square inch and at a temperature below 400° F., forming metal carbonyl during passage of reactants through said reaction zone, effecting conversion of reactants into carbonylic products, passing an effluent containing products of conversion and said metal carbonyl from said reaction zone into a secondary zone, maintaining a surface-active supporting material in said secondary zone at temperature and pressure conditions effective for decomposition of metal carbonyl, decomposing said metal carbonyl in said secondary zone, removing from said secondary zone a product stream substantially free from metal carbonyl, periodically reversing flow of said reactants and said effluent with respect to said reaction zone and secondary zone.

15. A method according to claim 14 in which said supporting material in the secondary zone comprises mainly uncalcined diatomaceous earth.

FRANK H. BRUNER.

REFERENCES CITED

The following references are of record in the file of this patent:

UNITED STATES PATENTS

| Number | Name | Date |
| --- | --- | --- |
| 1,631,823 | Jaciek | June 7, 1927 |
| 1,698,602 | Mittasch | Jan. 8, 1929 |
| 1,833,331 | Park | Nov. 24, 1931 |
| 2,111,469 | Francon | Mar. 15, 1938 |
| 2,250,421 | Riblett | July 22, 1941 |
| 2,324,746 | Weinrich et al. | July 20, 1943 |
| 2,351,248 | Wirth et al. | June 13, 1944 |

OTHER REFERENCES

Journal Chemical Society (British), vol. 97, page 800.